Patented Jan. 27, 1931

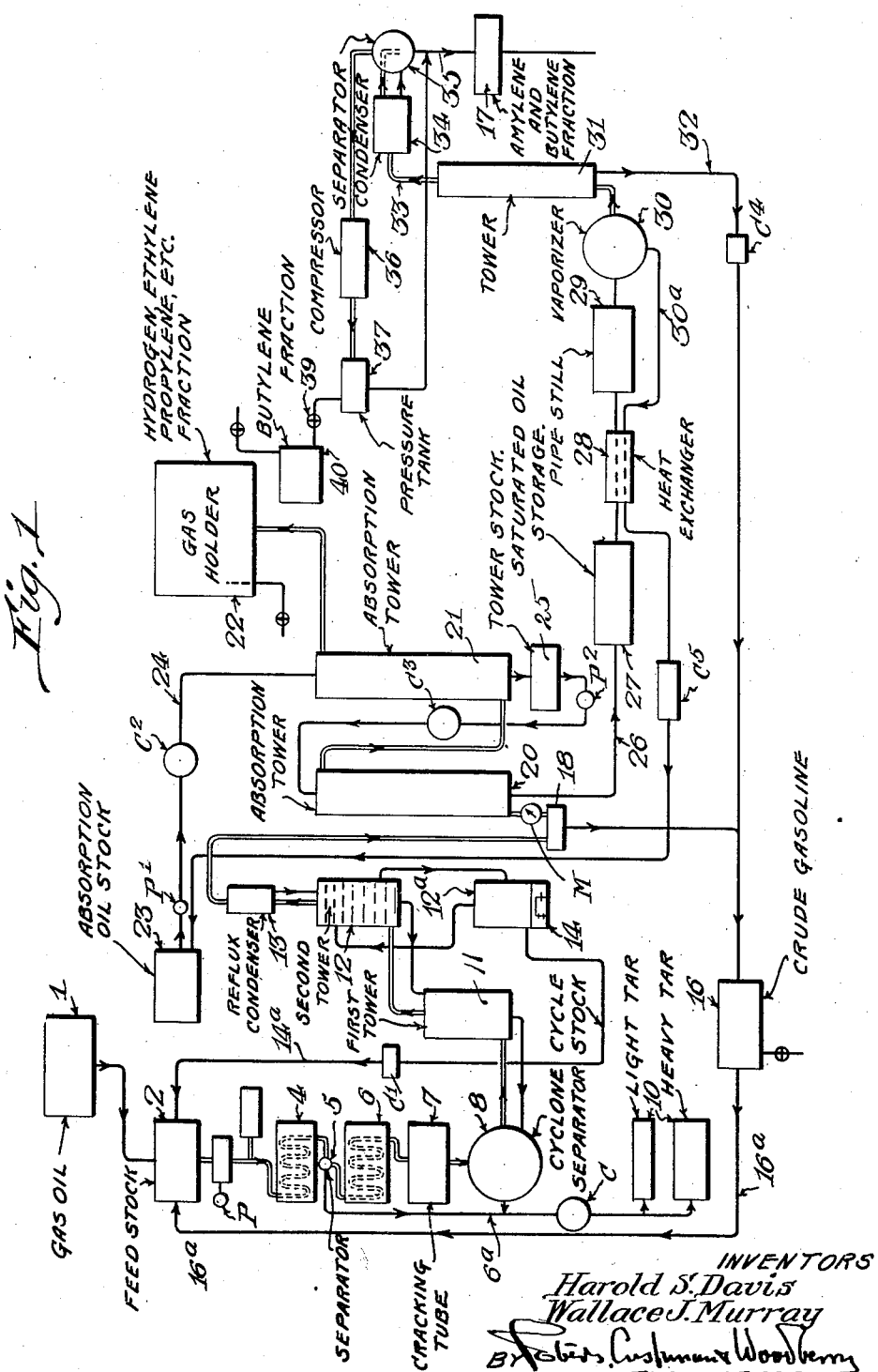

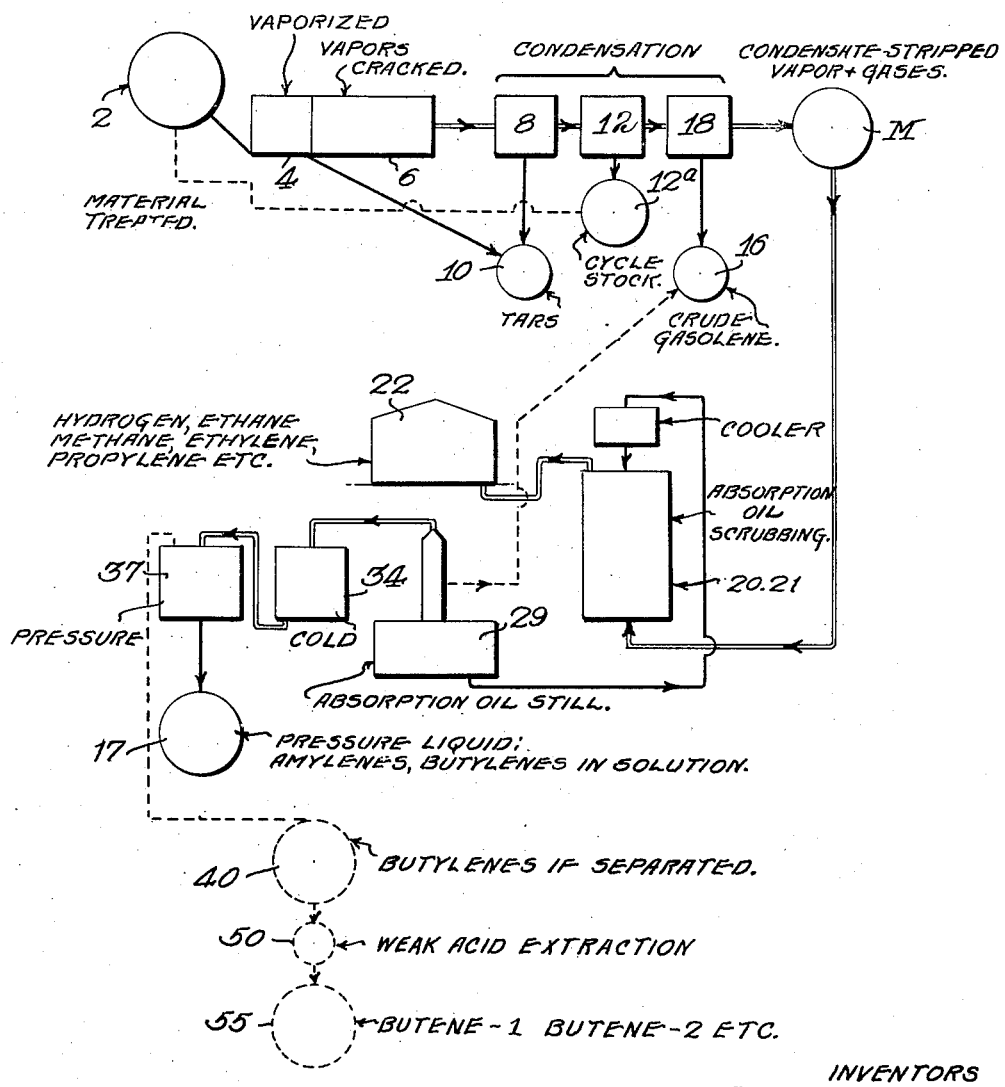

1,790,522

UNITED STATES PATENT OFFICE

HAROLD S. DAVIS, OF BELMONT, AND WALLACE J. MURRAY, OF READING, MASSA-CHUSETTS, ASSIGNORS, BY MESNE ASSIGNMENTS, TO PETROLEUM CHEMICAL CORPORATION, OF NEW YORK, N. Y., A CORPORATION OF DELAWARE

OLEFINE CONTAINING PRODUCT

Application filed February 24, 1927, Serial No. 170,631, and in Germany February 23, 1926.

This invention relates to the preparation, segregation and utilization of olefine hydrocarbons and to the production of their derivatives, including alcohols and other useful substances. The olefines may be derived from such materials as petroleum, peat, coal, oil shales, and like carboniferous natural materials by cracking or pyrogenesis, so called.

The olefine mixtures produced by heating such substances to degrees resulting in pyrogenetic transformations are, as well known, exceedingly complex, generally containing ethylene, propylene, butylene, amylenes, hexylenes and higher olefines of the general formula $C_nH_{2n}$. Unlike saturated hydrocarbons, olefines are capable of readily reacting or combining with reagents, including the polybasic acids (of which sulfuric acid or phosphoric acid are typical) the halogens and halogen compounds, hypocholorous and other acids.

Olefines when reacted upon by acids are capable of forming alkyl acid reaction products, and in turn these alkyl acid products may be hydrolyzed for conversion into alcohols of structural characteristics according to the different structures of the base (olefine) materials. For reasons fully set out in our application for Letters Patent for Preparation of olefine derivatives, filed February 24, 1925, Serial No. 10,992, an acid treatment of the whole material produced by cracking for the optimum conversion of the natural hydrocarbons to olefines is undesirable because of the various degrees of reactivity of components of the mixture produced by the most effective type of heat treatment for cracking of the natural hydrocarbons; for example cracking by the process disclosed and claimed in the application for Letters Patent by Earl P. Stevenson and Clarence K. Reiman filed February 13, 1925, Serial No. 8,907, which discloses a process comprising as steps subjecting the vapors of a petroleum or a fractional distillate of petroleum, such as "gas oil" so called, to heat during flow in a tubular retort with the effect of maintaining the vapors at a nearly constant cracking temperature during a relatively long time of flow, this constant temperature being such as to result in optimum development of olefine values; for example, as the result of treatment at a substantially constant temperature of a selected value between 600° C. and 650° C. during a sufficient time of flow to produce from 1000 to 1700 cubic feet of gaseous product per barrel of 42 gallons passed. When the olefine bearing gas is rich in highly reactive olefines, a single-stage treatment to obtain acid products can not be practiced; the reaction of the more highly reactive olefines and other hydrocarbons to form polymers upon treatment with acids capable of forming addition compounds with the less reactive olefines is too vigorous and too productive of heat to permit this even in the case of relatively lean gases.

If it were practicable to obtain mixed alkyl acid compounds and other derivatives of the rich gases, such as result from vapor phase cracking directed to the production of olefines, by a group reaction with acid, the result would not be desirable. The different alcohols, at least eight in number, resulting from hydrolysis of the obtainable compounds have boiling points ranging from 80° to 140° C., and separation from each other is in most cases not feasible. The uses of these alcohols (e. g. isopropyl and amyl alcohols) are widely divergent, and to produce them in admixture would be commercially undesirable.

This invention provides certain olefine bearing products, compositions or mixtures capable of improved utilization in the production of derivatives, for example secondary and tertiary alcohols. The new products claimed may be regarded in one aspect as progressive simplifications of a type of efflux mixture of products of a preferred kind of vapor-phase cracking of suitable hydrocarbon materials such as those above mentioned or any of them, but the valuable qualifications of any simplified mixture herein described and claimed rest upon its behavior as a starting-point material for the improved production by chemical treatment of derivative materials by practicable methods; and the value and identity of any such composition of matter is therefore obviously independent of the materials from which or the process by which the said material may be segregated or extracted from a more complex mixture; or of the materials from which or process by which the composition of matter or its ingredients may be compounded, or synthesised from hydrocarbons of other structures; or of the modes or processes of making derivatives in or for which the new material is of particular utility.

It will therefore be understood that mention of the source materials from which said composition of matter is derived or the process by which it is derived is informative only of the best mode known to us of making or compounding the said composition of matter, and except as expressed in the claims the source materials or the mode of preparation or mode of use hereinafter explained is not explained as a limitation of the invention.

One recommended procedure comprises a stage or stages of separation of a fraction or fractions of the material containing the olefine or olefine group to be recovered, followed by treatment selectively to differentiate and segregate the component olefine substances in accordance with their respective and relative chemical reactivities.

In the accompanying drawings,

Fig. 1 is a diagrammatic flow sheet of one form of apparatus in which cracking of a suitable hydrocarbon followed by stages of separation of the efflux material to arrive at a product and a simplified product according to this invention may be carried out; and Fig. 2 is a simplified diagram also illustrating stages of the production of the products herein claimed.

Referring to Fig. 1, a container 1 for the supply of oil may deliver to a feed stock reservoir 2, whence by a suitable pressure device P the material is forced into a preheater or primary vaporizer 4 (preferably a suitable tubular coil) and through a superheater or secondary vaporizer 6, which may be substantially the same kind of tubular heater as the primary preheater 4. Between the preheater 4 and superheater 6 the flowing stream, already substantially all vapor, may be subjected to treatment adapted to separate out the inclusions of low volatility, and pass on the vapors and gases. A liquid separator 5, preferably of a kind operating without substantial loss of heat, is recommended. Collected liquids from this separator may flow through a pipe 6ª and a cooler C to tar storage tanks 10.

Vapors superheated at 6 pass to a cracking tube 7. The effluent gases, vapors and suspensions from cracking are recommended to be treated in a separator 8, which may work on the cyclonic or centrifugal principle, and deliver its liquids into the pipe 6ª, and its vaporous and gaseous efflux into the bottom of the first of a series of separating and condensing towers, for example, the tower 11, adapted to countercurrent flow in contact of the vapors and gases and the condensate from tower 12, which in turn is adapted to countercurrent flow of the vapors and gases and the condensate from a fractionating condenser 13 of any suitable reflux type.

The tower 12 is preferably a fractionating tower of the bubble type. From the bottom is taken a relatively heavy fraction which is delivered into the top of tower 11, wherein it serves to condense and wash out any heavy and undesirable tars formed in the cracking reaction. From one of the lower plates of this tower is drawn off a fraction of substantially the same boiling range as the feed stock, but as this will, of necessity, contain some hydrocarbons in the motor spirit range, it can not be returned to the feed stock without materially decreasing the yield of motor spirit. Provision is included, therefore, for stripping this fraction of its lighter hydrocarbons, such as a fractionating tower 12ª, which is heated at the base at 14 and delivers overhead the desired fraction of its feed into one of the top plates of tower 12. The stripped cycle stock is delivered through a pipe 14ª and cooler C' to the feed stock tank. The overhead from 13 is cooled at 18, and the condensate at this point is crude motor spirit in the preferred operation of tower 12.

The vaporous effluent from condenser 18 is now fractionally condensed or absorbed, or otherwise treated to separate out a fraction or fractions of the olefines, which from their preponderant contents, may be described as an amylene and butylene fraction, and a gaseous fraction rich in propylene and ethylene. For example, the stripped gaseous effluent from condenser 18, a simplified product not herein claimed, may be separately collected or may be delivered through meter M.

It will be observed that the fraction or extract of the olefine-rich vapor phase efflux collected or flowing at M has been deprived of condensible tars at 5 and 8; that oil vapors of a boiling-point range comparable with the material in 2 have been condensed and removed at 12; and that volatiles in the gasoline boiling-point range have been condensed and removed at 18; for example, contents boiling at higher points than about 100° C. have been substantially removed. The material at M is therefore a suitable material as a starting point for the conversion of its high percentage (in excess of 50%) of valuable olefine contents by chemical treatment without complication by inclusions higher boiling than the amylenes. As more fully explained in said application Serial No. 10,992, further division and simplification of the mixed vaporous and gaseous product at M is desirable.

For example, this material is now scrubbed in absorption towers 20 and 21 by a countercurrent flow of cool absorption oil stored in a tank 23, delivered by a pump P' through a cooler $C^2$ and pipe 24 to the top of tower 21, to receiver 25, pumped at $P^2$ through a cooler $C^3$ to the top of tower 20, and the saturated oil delivered through a pipe 26 to a storage tank 27, whence the saturated oil may flow through a heat exchanger 28, pipe still 29 and vaporizer 30 to a refluxing tower 31, from which the liquids may be led through cooler $C^4$ to the crude motor-spirit or gasoline storage tank 16 by pipe 32. Unvaporized absorption oil from vaporizer 30 may flow through pipe $30^a$, heat exchanger 28, cooler $C^5$ to tank 23.

The vapors effluent at 33 may be delivered through a condenser 34 and a separator 35, whence the vapors pass to a compressor 36 and pressure storage tank 37. Condensates at 34, 35 and 37 may be delivered to tank 17, the pressures and temperatures being such as to provide at these points liquid fractions corresponding to the amylene-fraction fluid in tank 17. Pressure tank 37 may deliver, if desired, through a suitable reduction valve 39 to gas-holder 40, in which are collected the residual gases from the saturated scrubbing oil. This gaseous fraction, if so separated, represents substantially the major portion of the butylene hydrocarbons, whereas the residual gas from tower 21, collected in the holder 22, contains the propylene and ethylene, the hydrogen, methane, ethane and other gases of low molecular weight.

When appropriate conditions are realized in and prior to flow through the cracking tube 7, the respective fractions capable of being separated by steps of condensation or absorption are sharply characterized by the desired preponderance (amounting under good conditions to substantial freedom from mixture with each other) of the olefine substances sought to be collected and separated. Any suitable condensation or absorption fractionating treatment may therefore be resorted to, and the apparatus mentioned may be varied in accordance with engineering preferences.

By proper control of the temperature of the absorption oil and rate of flow of the vaporous and gaseous material from M, the operation is to cause a selective absorption in 20, 21 of amylenes and butylenes and their associated diolefines and delivery to holder 22 of gases of the boiling point of propylene ($-48.4°$ C.) and lower boiling points is readily effected.

By proper control of the temperature at 34 and of the rate and degree of compression at 36, and because of the high absorptive affinity of liquid amylenes (boiling range from 21° to 42° C. at normal pressures) for the butylenes (boiling range from $-6°$ C. to 1° C.) the amylene liquid may be caused to absorb substantially all of the butylenes as liquids, and to hold these substances in solution at ordinary temperatures under moderate superimposed pressures, for example from twenty to eighty pounds above atmospheric pressure. As more fully explained in the application for Letters Patent of Harold S. Davis Serial No. 43,208, filed July 13, 1925, the liquid form of this amylene-butylene mixture has value incidental to subsequent chemical treatment of the contents of this olefine liquid. Associated with the amylenes and butylenes are substantial inclusions of diolefines, believed to be butadienes, isoprene, and their homologues, and hexylenes and higher olefines in variable small proportions.

A typical instance of practice with quantities is as follows:

Feed stock.—32°–34° Bé. gas oil (from south Texas crude).

Feed rate.—1 bbl. per hour per six inch cracking tube.

Temperatures—
Vaporizer, 632° C. maximum.
Tube, 601° C. (average).

Conversions per bbl. passed

| | | |
|---|---|---|
| Process gas (sp. gr. 1.055) at M | 1035 | cu. ft. |
| Oil scrubbed gas (sp. gr. 0.929) at 22 | 675 | cu. ft. |
| Butylene fraction (non-condensed gas from distillation of saturated absorption oils) (sp. gr.—1.52) | 102 | cu. ft. |
| Amylene fraction (condensables recovered by fractionation to 60° C.) | 2.6 | gallons |
| Crude naphtha (condensables between 60° and 210° C.) | 9.3 | gallons |
| Cycle stock (condensables above 210° C.) | 19 | gallons |
| Tar residues | 2.1 | gallons |

Olefine content of gaseous fractions

| | |
|---|---|
| Process gas per cent olefines above ethylene | 33.1 |
| Oil scrubbed gas per cent olefines above ethylene | 17.8 |
| Butylene fraction per cent olefines above ethylene | 75.7 |

The olefine contents of the gases received at 22 and the pressure liquid received at 17, arranged inversely in their order of reactivity with sulfuric acid are:

| | Boiling points | State |
|---|---|---|
| 1. Ethylene $CH_2=CH_2$ | $-103°$ C. | Gas |
| 2. Propylene $CH_3-CH=CH_2$ | $-48.5°$ C. | Gas |
| 3. Pentene-1 $CH_3-CH_2-CH_2-CH=CH_2$ | 39–40° C. | Liquid |
| 4. Pentene-2 $CH_3-CH_2-CH=CH-CH_3$ | 36° C. (741 mm.) | Liquid |
| 5. Butene-1 $CH_3-CH_2-CH=CH_2$ | $-5°$ C. | Gas or in solution |
| 6. Butene-2 $CH_3-CH=CH-CH_3$ | $+1°$ C. | Gas or in solution |
| 7. Isopropyl ethylene $\begin{matrix}CH_3\\CH_3\end{matrix}\!\!>\!CH-CH=CH_2$ | 21.1° C. | Liquid |
| 8. Unsymmetrical methyl ethyl ethylene $\begin{matrix}CH_3\\CH_3-CH_2\end{matrix}\!\!>\!C=CH_2$ | 31 to 33° C. | Liquid |
| 9. Trimethyl ethylene $\begin{matrix}CH_3\\CH_3\end{matrix}\!\!>\!C=C\!\!<\!\!\begin{matrix}CH_3\\H\end{matrix}$ | 37 to 42° C. | Liquid |
| 10. Iso-butylene $\begin{matrix}CH_3\\CH_3\end{matrix}\!\!>\!C=CH_2$ | $-6°$ C. | Gas or in solution |

The liquid at 17 may also contain—
11. Hexylenes, boiling range 55° C. to 75° C.
12. Higher olefines, boiling range to 150° C.

and not more than and generally much less than 20 per centum of hydrocarbons of other series such as the paraffins.

The amylene-butylene liquid at 17 thus comprises a cracked distillate of petroleum boiling under 100° C., containing not less than eighty per centum and generally more than ninety per centum of unsaturated hydrocarbons (hexylenes, amylenes, butylenes, diolefines) having as a group characteristic capacity to be polymerized by strong sulfuric acid, the liquid having a vapor pressure at 25° C. in excess of the pressure of 760 mm. of mercury. In other words, this liquid begins to boil at normal atmospheric temperatures and pressures, but at any usual temperatures remains a liquid at pressures of twenty to seventy pounds per square inch above atmospheric pressure.

The gases at 22 comprise another olefine mixture containing the propylene and ethylene of the gaseous efflux at M as well as the methane, ethane, hydrogen and other low-atomic-weight gases not absorbed by the oil absorption treatment. Typically this mixed gas has a specific gravity of 0.929, and by volume comprises over 0.675 of the material at M.

The amylene-butylene liquid at 17 is a starting-point material valuable for the convenient derivation by chemical treatment of the tertiary and secondary butyl and tertiary and secondary amyl alcohols by several available modes of treatment, as well as for a source of other derivatives of the contained olefines.

Butene-1 and butene-2 are secondary-base olefines which react to give the same secondary alcohol on treatment with an absorbing acid and hydrolysis, whereas iso-butylene is a tertiary-base olefine which reacts on acid absorption and the addition of water to a tertiary alcohol having the structure

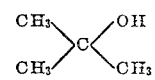

Iso-butylene being very greatly more reactive to absorption acids than butene-1 or butene-2, a preferential reaction with a weaker acid is available to extract this substance and the highly reactive diolefines from the association with secondary base olefines reacting to secondary alcohols.

The amylene olefines are of so nearly the same order of reactivity to absorption acids as to enable a group extraction of iso-butylene and tertiary base amylene olefines, by absorption in either sulfuric acid of appropriate concentration (about 65%, for example) or treatment with hydrochloric acid. After this extraction, the secondary-base butylene and amylene remainders are in condition for treatment with stronger acid, for example sulfuric acid of 77% or greater concentration.

Recoveries severally of tertiary butyl and amyl alcohols, and recoveries severally of secondary butyl and amyl alcohols from the olefine-acid products by hydrolysis and distillation are possible, the several alcohols of each of these groups having a sufficient differentiation of boiling points to enable their separation by rectifying distillation, or alternatively, the isomeric butylenes and amylenes can be separately recovered and treated for the production of alcohols.

As more fully explained in our said application Serial No. 10,992, the fraction containing the butylenes, butene-1, butene-2 and isobutylene, which substances collectively have a boiling-point range from −5° C. to 1° C. may be permitted on decrease of pressure to distill from its solution in the amylene liquid, or, alternatively, may be separated from the cold and compression stages 34, 37 without having been dissolved, and thence collected at 40. It will be observed that this fraction is a fraction of the pressure liquid of amylenes and butylenes in solution collected at 17, and this butylene product may be collected in any suitable pressure tank at 40 for separate use, if desired.

The butylene fraction may be treated as a gas or kept as a liquid by superimposed pressure. If separation of the butylene fraction containing butene-1, butene-2, and isobutylene is resorted to, as it may be whether or not the butylenes are dissolved in the amylene liquid, the butylene fraction may be passed as indicated at 50, Fig. 2, through sulfuric acid of a concentration of 60% more or less in such a manner as to effect as intimate contact as possible, for the purpose of selectively absorbing isobutylene, and removing the tertiary alkyl acid product from the secondary-base olefines, butene-1 and butene-2, which as a product may be collected at 55. One of the advantages of this procedure arises from having removed the isobutylene reacting to tertiary compounds since the reaction with the secondary-alcohol-forming substances with stronger acid for their conversion causes heating of lesser degree, and the natural rise of temperature, for example to 40° C., may be permitted to take place on treatment of the material at 55, unless acid more concentrated than 80% is resorted to, in which case it may be desirable to hold the temperature down to a point below 15° C.

We claim:

1. The olefine containing fraction of cracked hydrocarbon substances substantially as described containing more than eighty per centum of unsaturated hydrocarbons including amylenes and butylenes, and substantially free of inclusions of carbon compounds of lesser molecular weights than propylene.

2. The olefine containing fraction of cracked hydrocarbon substances substantially as described containing more than eighty per centum of unsaturated hydrocarbons including amylenes and butylenes, and substantially free of inclusions of carbon compounds of lesser atomic weights than propylene, and substantially free of inclusions boiling above 100° C. at atmospheric pressures.

3. The olefine containing fraction of cracked petroleum containing in excess of eighty per centum of unsaturated hydrocarbons of the boiling point ranges from −6° C. to 100° C. at atmospheric pressures and principally comprised of the amylenes and butylenes.

4. The herein described hydrocarbon liquid containing amylenes, butylenes, and other unsaturated hydrocarbons, and substantially free from olefines of lower boiling points than −6° C. and of any inclusion of higher boiling point than 100° C. at atmospheric pressures.

Signed by us at Boston, Massachusetts, this 23rd day of February, 1927.

HAROLD S. DAVIS.
WALLACE J. MURRAY.